United States Patent
Uchida et al.

(10) Patent No.: US 6,887,930 B2
(45) Date of Patent: May 3, 2005

(54) POLYAMIDE COMPOSITION

(75) Inventors: Koichi Uchida, Kurashiki (JP); Tetsuya Hara, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 187 days.

(21) Appl. No.: 10/150,964

(22) Filed: May 21, 2002

(65) Prior Publication Data
US 2003/0023008 A1 Jan. 30, 2003

(30) Foreign Application Priority Data
May 21, 2001 (JP) .................................... 2001-150275

(51) Int. Cl.[7] .............................................. C08L 77/00
(52) U.S. Cl. ...................... 524/430; 524/538; 525/432
(58) Field of Search ................. 524/430, 538; 525/432

(56) References Cited

U.S. PATENT DOCUMENTS

| | | | | |
|---|---|---|---|---|
| 5,143,983 A | * | 9/1992 | Yamagishi et al. | 525/432 |
| 5,670,608 A | | 9/1997 | Oka et al. | 528/322 |
| 5,786,423 A | | 7/1998 | Tsumiyama et al. | 525/66 |
| 6,156,869 A | | 12/2000 | Tamura et al. | 528/310 |
| 6,258,927 B1 | | 7/2001 | Oka et al. | 528/310 |
| 6,414,064 B1 | | 7/2002 | Matsuoka et al. | 524/404 |

FOREIGN PATENT DOCUMENTS

| | | |
|---|---|---|
| EP | 0 488 335 | 6/1992 |
| JP | 62-57458 | 3/1987 |
| JP | 7-53715 | 2/1995 |
| JP | 9-316731 | 12/1997 |
| JP | 11-279399 | 10/1999 |
| JP | 2000-86759 | 3/2000 |
| JP | 2001-106906 | 4/2001 |

* cited by examiner

*Primary Examiner*—Ana Woodward
(74) *Attorney, Agent, or Firm*—Oblon, Spivak, McClelland, Maier & Neustadt, P.C.

(57) ABSTRACT

A polyamide composition comprising 50 to 90 parts by weight of (A) semiaromatic polyamides having dicarboxylic acid units containing 60 to 100 mole % of terephthalic acid units and diamine units containing 60 to 100 mole %, in total, of 1,9-nonanediamine units and/or 2-methyl-1,8-octanediamine units, and 50 to 10 parts by weight of (B) aliphatic polyamides in which the average of total carbon atoms of dicarboxylic acid units and diamine units per one amide group is 7 to 12; having excellent moldability, toughness, light-weightness, hot water and steam resistance, heat resistance, mechanical characteristics, low water absorption, chemical resistance and melt stability; and are applicable for molding at low temperature with a conventional steam-heating or a conventional hot-water-heating type mold to give molded articles having sufficient heat resistance, rigidity at high temperature and dimensional stability.

28 Claims, 1 Drawing Sheet

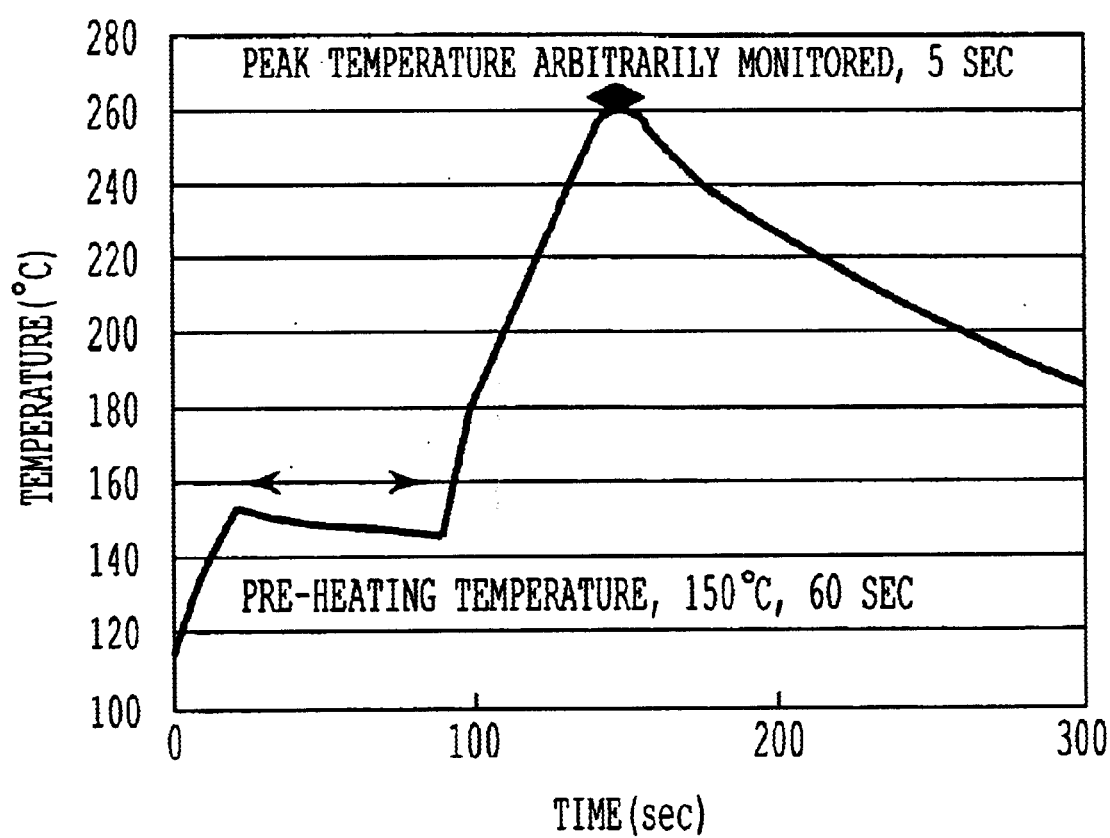

POLYAMIDE COMPOSITION

BACKGROUND OF THE INVENTION

1. Field of the Invention

The present invention relates to a polyamide composition and a molded article therefrom. The polyamide compositions of the present invention have excellent moldability, toughness, light-weightness, as well as excellent hot water and steam resistance, heat resistance, mechanical characteristics, low water absorption and chemical resistance. The polyamide compositions of the present invention can be used as molding materials for industrial materials or household goods.

2. Description of the Background

Crystalline polyamides represented by nylon 6 and nylon 66 have been used widely in fibers for clothing or industrial materials, and as general-purpose engineering plastics, because they have excellent properties and melt moldability. Such general-purpose polyamides are, however, pointed out to have problems such as insufficient heat resistance and poor dimensional stability due to water absorption. Particularly in recent years, polyamides to be used in the fields of electrical and electronic parts, automobile parts and engineering plastics have been requested to have high-level of properties. For example, with the development of the surface mounting technique (SMT) in the fields of electrical and electronic parts, polyamides are required to have high heat resistance such as solder resistance. Also in the fields of automobile parts including engine room parts, polyamides having more improved heat resistance than the conventional ones are demanded. As they have come to be used for a variety of applications, polyamides superior in physical properties and functions are requested not only in the field of electrical and electronic parts and automobile parts but also in the other fields. There is a strong demand for the development of polyamides excellent in dimensional stability, mechanical properties and chemical resistance as well as high heat resistance.

To meet the above requirements, semiaromatic polyamides comprising terephthalic acid and 1,6-hexanediamine as main components (hereinafter referred to as 6-T polyamides) are proposed. Aromatic polyamides comprising terephthalic acid and 1,6-hexanediamine have a melting point near 370° C., which exceeds the decomposition temperature of the polymer and hence cannot be melt molded. The 6-T polyamides are therefore currently used after modification to decrease their melting point to about 280–320° C. by copolymerizing 30 to 40 mole % of a dicarboxylic acid component such as adipic acid and isophthalic acid or a lactam such as ε-caprolactam and laurolactam. However, copolymerization of such a large amount of a third component and, in some cases, further a fourth component, which is effective in decreasing the melting point of the polyamide, also decreases the rate of crystallization, the attainable degree of crystallization, heat resistance and thermal stability, thereby reducing the obtainable properties such as rigidity at high temperature, chemical resistance and imensional stability, melt stability and prolonging the molding cycle to decrease productivity.

U.S. Pat. No. 5,670,608 discloses a polyamide (which will hereinafter be abbreviated as "PA9-T") comprising (i) terephthalic acid and 1,9-nonanediamine or (ii) terephthalic acid, 1,9-nonanediamine and 2-methyl-1,8-octanediamine. PA9-T does not involve a problem upon practical use because it has a melting point at about 320° C., and it exhibits excellent properties in rigidity at high temperature, chemical resistance, dimensional stability and melt stability. When the polyamide is molded using a steam-heating or hot-water-heating type mold, however, insufficient crystallinity of the polyamide at low mold temperature makes the molded articles have reduced properties such as rigidity at high temperature and dimensional stability. In practice, therefore, PA9-T needs a mold temperature, upon injection molding, as high as 140° C.

Japanese Patent Laid-Open No. 2000-86759 discloses a polyamide comprising terephthalic acid, 1,9-nonanediamine, 2-methyl-1,8-octanediamine and an aliphatic dicarboxylic acid such as adipic acid and sebacic acid. The polyamide has sufficient crystallinity even by molding with a steam-heating or a hot-water-heating type mold, and also has excellent properties in rigidity at high temperature, dimensional stability, toughness, chemical resistance and melt stability. It is, however, recognized that the copolymerization of an aliphatic dicarboxylic acid leads to reduction of heat resistance of the polyamide.

In the fields of electrical and electronic fields, the surface mounting technique (SMT) which needs high heat resistance has came to be popular. The polyamide, described in Japanese Patent Laid-Open No. 2000-86759, prepared by copolymerization of an aliphatic dicarboxylic acid, however, cannot meet such a requirement.

There is, therefore, a demand for a polyamide having sufficient crystallinity even by molding with a steam-heating or a hot-water-heating type mold without a reduction of heat resistance of PA9-T.

SUMMARY OF THE INVENTION

An object of the present invention is to provide a polyamide materials which does not lose excellent properties of PA9-T such as heat resistance, toughness, moldability, light-weightness, low water absorption, chemical resistance and melt stability; and are applicable for molding at low temperature with a conventional steam-heating or a conventional hot-water-heating type mold to give molded articles having sufficient heat resistance, rigidity at high temperature and dimensional stability.

The present inventors have found that a polyamide composition obtained by blending a specific aliphatic polyamide with PA9-T has greatly reduced glass transition temperature and crystallization temperature while maintaining the melting point of the PA9-T; shows sufficient crystallinity at low molding temperature using a conventional steam-heating or a conventional hot-water-heating type mold to give the molded article having excellent heat resistance; and moreover has excellent properties such as toughness, moldability, light-weightness, low water absorption, chemical resistance, hot water and steam resistance and melt stability. It is surprising that, since the glass transition temperature of the above-described polyamide composition is reduced remarkably without lowering its melting point, water tends to evaporate from the polyamide composition in the preliminary heating stage of a reflow soldering step, leading to improvement in blister resistance.

In one aspect of the present invention, there is provided a polyamide composition, which comprises 50 to 90 parts by weight of (A) one or more semiaromatic polyamides having dicarboxylic acid units containing 60 to 100 mole % of terephthalic acid units and diamine units containing 60 to 100 mole %, in total, of 1,9-nonanediamine units and/or 2-methyl-1,8-octanediamine units; and 50 to 10 parts by weight of (B) one or more aliphatic polyamides in which the average of total carbon atoms of dicarboxylic acid units and diamine units per one amide group is 7 to 12.

In another aspect of the present invention, there is provided a molded article comprising a polyamide composition described above.

In one aspect of the present invention, there is provided a method of making the polyamide composition described above, comprising combining (A) and (B).

In one aspect of the present invention, there is provided a method of making the molded article described above, comprising molding the polyamide composition into the article.

A more complete appreciation of the invention and many of the attendant advantages thereof will be readily obtained as the same becomes better understood by reference to the following Figures in conjunction with the detailed description below.

BRIEF DESCRIPTION OF THE DRAWINGS

FIG. 1 is a characteristic graph showing a thermal profile of the test piece heated in an infra-red oven, when the peak temperature is set at 260° C.

DETAILED DESCRIPTION OF THE PREFERRED EMBODIMENTS

The dicarboxylic acid units of the semiaromatic polyamides (A) contain terephthalic acid units in an amount of from 60 to 100 mole %, preferably from 75 to 100 mole %, and more preferably from 90 to 100 mole %. These ranges include all specific values and subranges therebetween, such as 70, 80, 85, 95, 96, 97, 98, and 99 mole %. When the content of terephthalic acid units is lower than 60 mole %, the heat and chemical resistance of the semiaromatic polyamides (A) is reduced.

The semiaromatic polyamides (A) may contain additional dicarboxylic acid units other than terephthalic acid units. The additional dicarboxylic acid unit can include, for example, units derived from alicyclic dicarboxylic acids such as 1,3-cyclopentanedicarboxylic acid and 1,4-cyclohexanedicarboxylic acid; aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid and 4,4'-biphenyldicarboxylic acid; and aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, suberic acid, undecanedicarboxylic acid, dodecanedicarboxylic acid and a dimeric acid. The semiaromatic polyamides (A) may contain one or more types of those additional dicarboxylic acid units. Among them, preferred are those derived from aromatic dicarboxylic acids such as isophthalic acid or those derived from adipic acid, azelaic acid, sebacic acid or dodecanedicarboxylic acid. The dicarboxylic acid units of the semiaromatic polyamides (A) can contain such additional dicarboxylic acid unit in an amount of preferably not more than 40 mole %, more preferably not more than 25 mole %, still more preferably not more than 10 mole %. These ranges include all specific values and subranges therebetween, such as 35, 30, 20 and 15 mole %. The semiaromatic polyamides (A) may further contain units derived from polyfunctional carboxylic acids such as trimellitic acid, trimesic acid and pyromellitic acid so long as the semiaromatic polyamide is melt-moldable.

The diamine units of the semiaromatic polyamides (A) contain 1,9-nonanediamine unit and/or 2-methyl-1,8-octanediamine unit in an amount of from 60 to 100 mole %, preferably from 75 to 100 mole %, more preferably from 90 to 100 mole %. These ranges include specific values and subranges therebetween, such as 70, 80, 85, 95, 96, 97, 98, and 99 mole %. The semiaromatic polyamides, in which the diamine units thereof contain 1,9-nonanediamine unit and/or 2-methyl-1,8-octanediamine unit in an amount of lower than 60 mole %, give moldings having reduced properties in at least one of toughness, light-weightness, low water absorption, chemical resistance, heat resistance or melt stability. When 1,9-nonanediamine unit and 2-methyl-1,8-octanediamine unit are combined for use, it is desirable that the ratio by mol of 1,9-nonanediamine unit/2-methyl-1,8-octanediamine unit falls between 99/1 and 10/90, more preferably between 95/5 and 20/80.

The semiaromatic polyamides (A) may contain additional diamine units other than 1,9-nonanediamine units and 2-methyl-1,8-octanediamine units. The additional diamine unit can include, for example, units derived from linear aliphatic alkylenediamines such as 1,6-hexanediamine, 1,7-heptanediamine, 1,8-octanediamine, 1,10-decanediamine, 1,11-undecanediamine and 1,12-dodecanediamine; branched aliphatic alkylenediamines such as 2-methyl-1,5-pentanediamine, 3-methyl-1,5-pentanediamine, 2,5-dimethyl-1,6-hexanediamine, 2,2,4-trimethyl-1,6-hexanediamine, 2,4,4-trimethyl-1,6-hexanediamine and 5-methyl-1,9-nonanediamine; alicyclic diamines such as cyclohexanediamine, methylcyclohexanediamine, isophoronediamine, bis(4-aminocyclohexyl)methane, norbornanedimethylamine and tricylodecanedimethylamine: and aromatic diamines such as p-phenylenediamine, m-phenylenediamine, m-xylylenediamine, p-xylylenediamine, 4,4'-diaminodiphenylsulfone and 4,4'-diaminodiphenylether. The semiaromatic polyamides (A) may contain one or more types of those additional diamine units. Among them, preferred are those derived from 1,6-hexanediamine, 1,7-heptanediamine, 1,10-decanediamine or 1,12-dodecanediamine. The diamine units of the semiaromatic polyamides (A) can contain such additional diamine unit in an amount of preferably not more than 40 mole %, more preferably not more than 25 mole %, still more preferably not more than 10 mole %. These ranges include all specific values and subranges therebetween, such as 35, 30, 20 and 15 mole %.

The aliphatic polyamides (B) has 7 to 12 carbon atoms on average with respect to the total number of carbon atoms of dicarboxylic acid units and diamine units per one amide group. This range includes all specific values and subranges therebetween, such as 8, 9, 10, and 11. The aliphatic polyamides (B) include polyamides L prepared by ring opening polymerization of a lactam or by polycondensation of an aminocarboxylic acid, wherein L means the number of carbon atoms of the lactam or aminocarboxylic acid and stands for an integer of 7 to 12; and polyamides MN prepared by polycondensation of an aliphatic diamine and an aliphatic dicarboxylic acid, wherein M represents the number of carbon atoms of the aliphatic diamine, and N represents the number of carbon atoms of the aliphatic dicarboxylic acid and they satisfy the following equation (1):

$$7 \leq (M+N)/2 \leq 12 \tag{1}$$

When polyamide compositions are prepared using an aliphatic polyamide having less than 7 carbon atoms in average with respect to the total number of carbon atoms of dicarboxylic acid units and diamine units per one amide group and a semiaromatic polyamide (A), their glass transition temperature and crystallization temperature are not sufficiently reduced in order to make the polyamide composition have sufficient crystallinity at low molding temperatures. In addition, the water absorption of the polyamide composition is promoted. On the other hand, when polyamide compositions are prepared using an aliphatic polyamide having carbon atoms higher than 12 carbon atoms in average with respect to the total number of carbon atoms of dicarboxylic acid units and diamine units per one amide group and a semiaromatic polyamide (A), it is necessary to blend them at high temperatures for many hours because the compatibility between the aliphatic polyamide and semiaromatic polyamide (A) tends to be poor. This not only disturbs improvement of productivity but also causes the decomposition of polyamides and a reduction of mechanical and physical properties of polyamides due to generation of byproducts such as triamine and ammonia.

Lactams for producing polyamides L include laurolactam and so on. Preferred example of aminocarboxylic acid for producing polyamides L include 9-aminocaproic acid, 11-aminoundecanecarboxylic acid and 12-aminododecanecarboxylic acid.

Aliphatic amines for producing polyamides MN include linear or branched aliphatic diamines such as tetramethylenediamine, 1,6-hexanediamine, 1,8-octanediamine, 1,9-nonanediamine, 1,10-decanediamine, 1,11-undecanediamine, 1,12-dodecanediamine, 2-methyl-1,8-octanediamine, 2-methyl-1,5-pentanediamine, 3-methyl-1,5-pentanediamine, 2,2,4-trimethyl-1,6-hexanediamine, 2,4,4-trimethyl-1,6-hexanediamine and 5-methyl-1,9-nonanediamine. Among them, 1,9-nonanediamine and/or 2-methyl-1,8-octanediamine are preferable in view of compatibility with the semiaromtic polyamides (A) and the melting point of the resulting polyamide composition.

Aliphatic dicarboxylic acids for producing polyamides MN include succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, suberic acid, undecanedicarboxylic acid, dodecanedicarboxylic acid and a dimeric acid.

Preferred examples of polyamide L include nylon 9, nylon 11and nylon 12. Preferred examples of polyamide MN include nylon 69, nylon 610, nylon 612,nylon 96, nylon 99, nylon 910, nylon 912and nylon 1212.

As the aliphatic polyamides (B), polyamides having 9 carbon atoms in average with respect to the total number of carbon atoms of dicarboxylic acid units and diamine units per one amide group are preferred from the viewpoints of reduction of glass transition temperature, crystallization temperature and water absorption of the resulting polyamide composition and improvement in compatibility with the semiaromatic polyamides (A). Of these, polyamides 612 and polyamides 99 are more preferred. The polyamides 99 preferably have, as diamine units, 1,9-nonanediamine units and/or 2-methyl-1,8-octanediamine units, wherein the molar ratio of 1,9-nonanediamine units based on 2-methyl-1,8-octanediamine units falls preferably from 100/0 to 70/30, more preferably from 95/5 to 80/20. In the present invention, one or more types of the above-described aliphatic polyamides (B) (as well as polyamide (A) can be used.

The weight ratio of the semiaromatic polyamides (A) based on the aliphatic polyamides (B) falls between 50/50 and 90/10. When the semiaromatic polyamides (A) and aliphatic polyamides (B) are blended at a weight ratio within the above-described range, the resulting polyamide compositions have sufficient crystallinity at low molding temperatures to show excellent melt flowability, heat resistance, toughness, tensile strength and rigidity at high temperature, even if a steam-heating or a hot-water-heating type mold is used upon injection molding. The weight ratio of the semiaromatic polyamides (A) based on the aliphatic polyamides (B) falls preferably between 60/40 and 90/10, and more preferably between 60/40 and 85/15.

In view of retention of a degree of polymerization and melt stability, semiaromatic polyamides (A) and aliphatic polyamides (B) are preferably ones in which at least 10% of the terminal groups in the molecular chain are blocked with a terminal-blocking agent. More preferably, in the molecular chain of the polyamide (A) or (B), the ratio of the terminal groups blocked with a terminal-blocking agent, that is the percentage of terminal-blocking, is at least 50%, still more preferably at least 80%.

The percentage of terminal-blocking can be obtained by determining the number of the terminal carboxyl groups, the number of terminal amino groups and the number of terminals blocked with a terminal blocking agent, and then calculating by the formula (2) shown below. It is desirable, in view of precision and ease, to determine the number of each of the terminal groups by subjecting the polyamide to $^1$H-NMR spectroscopy and then calculating the number from the integrated intensity of the characteristic signals corresponding to the terminal groups. Where the characteristic signal of the terminal group blocked with a terminal-blocking agent cannot be identified, the percentage of terminal-blocking can be obtained as follows. At first, the total number of the terminal groups is calculated from the intrinsic viscosity [η] of the polyamide. Next, the number [eq/g] of terminal carboxyl groups and that [eq/g] of terminal amino groups are determined by titration. The titration for terminal carboxyl groups is conducted on a solution of the polyamide in benzyl alcohol with 0.1N sodium hydroxide and that for terminal amino groups is conducted on a solution of the polyamide in phenol with 0.1N hydrochloric acid. Then the percentage of terminal-blocking is calculated by the formula (2) shown below:

Percentage of terminal-blocking=$[(a-b)/a] \times 100$ (2)

Wherein "a" represents total number of the terminal groups, which is generally equal to twice the number of polyamide molecules, and"b" represents total number of terminal arboxyl groups and terminal amino groups.

The terminal-blocking agent may be a monofunctional compound having reactivity with the terminal amino groups or the terminal carboxyl groups in polyamides. Preferred terminal-blocking agents are monocarboxylic acids or monoamines, since their reactivity is high and since the terminal groups of polyamides are stably blocked with them. More preferred are monocarboxylic acids, as they are easy to handle. In addition, acid anhydrides, monoisocyanates, mono-acid halides, monoesters, monoalcohols can be used as the terminal-blocking agent.

The monocarboxylic acids can include, for example, aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; and a mixture of any one of them. Among them, preferred are acetic acid, propionic acid, butyric acid, valeric acid, caproic acid, caprylic acid, lauric acid, tridecanoic acid, myristic acid, palmitic acid, stearic acid and benzoic acid, in view of their reactivity and costs and of the stability of the blocked terminals.

The monoamines can include, for example, aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamide; and a mixture of any one of them. Among them, preferred are butylamine, hexylamine, octylamine, decylamine, stearylamine, cyclohexylamine and aniline, in view of their reactivity and costs and of the stability of the blocked terminals.

The semiaromatic polyamides (A) and aliphatic polyamides (B) can be produced by a known process. They can be produced from an acid chloride and a diamine by a solution polymerization or an interfacial polymerization. Also, they can be produced from a dicarboxylic acid and a diamine by a melt polymerization or a solid phase polymerization.

For example, semiaromatic polyamides (A) can be produced, for example, by a method comprising following steps of (i) forming a nylon salt by mixing of a diamine and a dicarboxylic acid, if necessary, together with a catalyst and/or a terminal blocking agent; (ii) converting the formed nylon salt, at the temperature of 200 to 250° C., into a prepolymer having intrinsic viscosity [η] of 0.1 to 0.25 dl/g as determined in concentrated sulfuric acid at 30° C. and (iii) subjecting the prepolymer to a solid phase polymerization or polymerization with melt extruder. When the intrinsic viscosity [η] of the prepolymer falls within the range of 0.1 to 0.25 dl/g, polymerization of the prepolymer proceeds with good retention of a balance between carboxyl groups and amino groups and with little decrease in the polymerization rate to give a polyamide having a small molecular weight distribution, excellent properties and excellent moldability. When the polymerization of the prepolymer is effected by solid phase polymerization, it is preferably carried out under reduced pressure or in a stream of an inert gas. In addition, at a temperature of 180 to 260° C., the polymerization proceeds with a high polymerization rate, good productivity and reduced coloring or gelation. On the other hand, when the polymerization of the prepolymer is effected with a melt extruder, it is desirable to employ a polymerization temperature of not more than 350° C., in view of producing a polyamide with minimum degradation and decomposition.

One example of preparation processes of the aliphatic polyamides (B) is described. The aliphatic polyamide (B) can be prepared readily by mixing a diamine and a dicarboxylic acid together with, if necessary, a catalyst and a terminal-blocking agent, subjecting the resulting mixture to the polymerization at 200 to 250° C. while removing the formed water, and promoting the polymerization to the Completion under reduced pressure. The mixing step is preferably effected in an inert gas. In addition, polymerization temperatures between 200 and 250° C. can make the polymerization proceed with a high polymerization rate, good productivity and effectively suppressed coloring or gelation.

It is preferable to use a phosphorous-based catalyst in the preparation of polyamides for the purpose of enhancing the reaction rate and of preventing the degradation of the formed polyamides. The phosphorus-based catalyst includes, for example, phosphoric acid, phosphorous acid, hypophosphorous acid, and salts or ester derivatives thereof. Of those, preferred are hypophosphorous acid and its derivatives, in view of the quality of the formed polyamides. More preferred is sodium hypophosphite, in view of availability and handling property. The amount of the phosphorous-based catalyst preferably falls between 0.01 and 5% by weight, more preferably between 0.05 and 2% by weight, still more preferably between 0.07 and 1% by weight, relative to the total amount of the dicarboxylic acid component and the dismine component.

In addition, the amount of the terminal-blocking agent is properly set depending on the various factors such as the reactivity of the terminal-blacking agent, boiling point of the terminal-blocking agent, kind of reaction vessel and reaction conditions. The amount of the terminal-blocking agent preferably falls between 0.1and 15% by mole, relative to the total amount of the dicarboxylic acid component and the diamine component.

The intrinsic viscosity [η] of the polyamide (A) or (B) of the present invention, as measured in concentrated sulfuric acid at 30° C, falls preferably between 0.4 and 3.0 dl/g, more preferably between 0.5 and 2.0 dl/g, still more preferably between 0.6 and 1.8 dl/g, in view of mechanical properties and moldability. These ranges include all specific values and subranges therebetween, such as 0.7, 0.8, 1.0, 1.2, 1.5, 2.2, 2.5, 2.8, 3.2, 3.5, and 3.8 dl/g.

Addition of a metal hydroxide and/or a metal oxide to the polyamide composition of the present invention can suppress the amide exchange reaction between polyamides to improve the heat resistance of the resulting polyamide composition. This is particularly effective for suppressing the reduction of melting point caused by amide exchange reaction when the polyamide contains an acidic catalyst or an acidic additive. The metal hydroxide and/or the metal oxide is preferably added in an amount ranging from 0.1 to 20 parts by weight, more preferably 1 to 10 parts by weight, relative to 100 parts by weight, in total, of the semiaromatic polyamides (A) and aliphatic polyamides (B).

Metal hydroxides can include, for example, magnesium hydroxide, aluminum hydroxide, calcium hydroxide and barium hydroxide. Mixtures of these compounds can be used. Among them, magnesium hydroxide and/or aluminum hydroxide are preferred, because they can effectively suppress the amide exchange reaction between polyamides due to their excellent acid-trapping property and they can give heat resistance and flame retardance to the resulting polyamide composition.

Metal oxides can include, for example, magnesium oxide, aluminum oxide, calcium oxide and barium oxide. Mixtures of these compounds can be used. Among them, magnesium oxide and/or aluminum oxide are preferred, because they can effectively suppress the amide exchange reaction between polyamides due to their excellent acid-trapping property and they can give heat resistance and flame retardance to the resulting polyamide composition.

The polyamide composition of the present invention may contain a flame retardant having one or more bromine atoms. Such a flame retardant can give excellent flame retardance on the polyamide composition of the present invention. The flame retardants having a bromine atom include, for example, brominated polystyrenes, brominated polyphenylene ethers, brominated bisphenol A type epoxy resin, brominated styrene-maleic anhydride copolymer, brominated epoxy resins, brominated phenoxy resins, decabromodiphenyl ether, decabromobiphenyl, brominated polycarbonate, perbromotricyclopentadecane, brominated aromatic cross-linked polymer. One or more types of these compounds can be used as the flame retardant. Among them, brominated polystyrenes are preferable. The flame retardant having a bromine atom may have another functional group such as an acid group and epoxy group. The content of bromine atom falls preferably 15 and 87% by weight based on the weight of the flame retardant having bromine atom. The amount of the flame retardant having bromine atom falls preferably between 1 and 100 part by weight, more preferably between 10 and 75 part by weight, based on the 100 part by weight of the total amount of the semiaromatic polyamides (A) and the aliphatic polyamides (B).

The polyamide composition of the present invention may contain a flame-retardant synergist. Examples of the flame-retardant synergist include metal salts of stannic acid such as zinc stannate, zinc hydroxystannate, magnesium stannate, cobalt stannate, sodium stannate and potassium stannate; metal salts of boric acid such as zinc borate, calcium borate and magnesium borate; antimony oxide, antimony pentoxide, sodium antimonate, tin oxide, zinc oxide, ferric oxide, magnesium hydroxide, calcium hydroxide, a kaolinite, a clay and calcium carbonate. One or more types of these compounds can be used as the flame-retardant synergist. Among them, sodium antimonate, zinc stannate and zinc borate are preferred. In order to improve their dispersibility in polyamides, flame-retardant synergists may be subjected to surface treatment with silane couplers, titanium couplers or the like. The amount of the flame-retardant synergist falls preferably between 0.1 and 50 part by weight, more preferably between 1 and 30 part by weight, based on the 100 part by weight of the total amount of the semiaromatic polyamides (A) and the aliphatic polyamides (B). The metal salts of stannic acid and/or the metal salts of boric acid having crystal water can be used directly as they are, however it is preferable to bake them at around a temperature not lower than about 400° C. to remove crystal water therefrom before use. The flame-retardant synergists are generally in the form of solid powder. Preferably, the powdery solid have a mean particle size of preferably not more than 100 μm, more preferably not more than 30 μm, still more preferably not more than 10 μm, in order to obtain moldings having better appearances.

The polyamide composition of the present invention may contain a nucleating agent which is conventionally used for polyamides. Examples of the nucleating agent include talc, silica, graphite, magnesium oxide, aluminum oxide, calcium stearate, barium stearate, zinc stearate, and a mixture of any one of them. Among them, talc is preferable, because it is effective to enhance the crystallization rate of polyamides. In order to improve their compatibility with polyamides, nucleating agents may be subjected to surface treatment with silane couplers, titanium couplers or the like. The amount of the nucleating agent falls preferably between 0.01 and 10 part by weight, more preferably between 0.1 and 1 part by weight, based on the 100 part by weight of the total amount of the semiaromatic polyamides (A) and the aliphatic polyamides (B). The nucleating agents can be added during the polymerization of polyamide, or can be added by dry blending or by melt kneading through an extruder.

The polyamide composition of the present invention can contain a filler having various shapes such as powder, fiber and cloth.

The powdery filler includes, for example, talc, silica, silicaalumina, alumina, titanium oxide, zinc oxide, boron nitride, mica, potassium titanate, potassium silicate, magnesium sulfate, aluminum borate, asbestos, wollastonite, a whisker of potassium titanate, a whisker of calcium carbonate, a whisker of aluminum borate, glass beads, carbon black:, graphite, molybdenum disulfide and polytetrafluoroethylene. The powdery filler improves the dimensional stability, the heat resistance, the chemical and physical properties, the sliding properties of the moldings made by the polyamide composition. The mean particle size of the powdery filler falls preferably between 0.1 and 200 μm, more preferably between 1 and 100 μm.

The fibrous filler includes, for example, organic fibrous fillers such as wholly aromatic polyamide fibers, e.g., of polyparaphenylene-terephthalamide fibers, polymetaphenylene-terephthalamide fibers, polyparaphenylene-isophthalamide fibers or fibers obtained from a condensate of diaminodiphenyl ether and terephthalic or isophthalic acid; wholly aromatic liquid-crystal polyester fibers and polyvinyl alcohol fibers. The fibrous filler also includes, for example, inorganic fibrous fillers such as glass fibers, carbon fibers, alumina fibers, metallic fibers and boron fibers. The fibrous filler improves the sliding properties, the mechanical properties, the heat resistance, the chemical and physical properties of the moldings made by the polyamide composition. The mean length of the fibrous filler falls preferably between 0.05 and 50 mm, more preferably between 1 and 10 mm, as the moldability of the polyamide composition containing the filler is much improved and, in addition, the sliding properties, the heat resistance and the mechanical properties of the moldings of the composition are also improved. The fibrous filler may be fabricated into cloths, etc.

The above described fillers may be used singly or in combination. These fillers are used in an amount of preferably 0.1 to 200 parts by weight, and more preferably 0.1 to 150 parts by weight, based on 100 parts by weight of the total amount of the semiaromatic polyamides (A) and the aliphatic polyamides (B). These fillers may be treated with silane couplers or titanium couplers.

The polyamide compositions may further contain, as required, another polymers such as polyphenylenesulfides, polyolefins, polyesters, polyphenyleneoxides and liquid crystal polymers. In addition, the polyamide compositions may further contain another additives such as anti-dripping agents, e.g., of polytetrafluoroethylene; stabilizers, e.g., of copper compounds; coloring agents, UV absorbents, light stabilizers, antioxidants, e.g., of hindered phenol-based, hindered amine-based, phosphorus-based or thio-based antioxidants; antistatic agents, plasticizers and lubricants.

The polyamide compositions of the present invention can be prepared by blending a semiaromatic polyamide (A) and an aliphatic polyamide (B), and if necessary, together with other component such as above described metal hydroxides, metal oxides, flame retardants having brine atom, flame-retardant synergists, nucleating agents, fillers, another polymers or another additives, by a conventional method, preferably by kneading through a melt extruder, more preferably by kneading through twin screw extruder. Fillers and/or another additives can be added during the preparation of polyamide, or can be added by dry blending.

The polyamide compositions of the present invention has excellent moldability and can be molded into various shaped articles by injection molding, blow molding, extrusion, compression moldings, drawing, stretching, vacuum forming or the like molding processes.

Examples of the molded articles available from the polyamide composition of the present invention include, as well as a variety of usual applications in engineering plastics, mechanical parts such as bearing retainer, belt chain, clamper, pulley, gear, cases, washer, bolt, nut and traveler; automobile parts such as radiator tank, engine mount, fan, oil filter bracket, oil strainer, oil pan, cylinder head cover, fuel filter, inlet manifold, air duct, wire harness connector, junction box, starter coil bobbin and lamp reflector; electrical and electronic parts such as connector, switch, volume, bobbin, relay base and condenser mount; and household goods.

As a mold used upon injection molding of the polyamide composition of the present invention, a steam-heating or a hot-water-heating type mold which is not suited for molding of the semiaromatic polyamides (A). The polyamide compositions of the present invention shows sufficient crystallinity at low molding temperature of only 120° C. or so, which is the highest temperature that a conventional steam-heating or a conventional hot-water-heating type mold can be set, to give a molded article having sufficiently high deflection temperature under load. In addition, the polyamide composition of the present invention permits shorter mold cooling time to give sufficient crystallization than the semiaromatic polyamides (A), so that this advantage leads to the improvement of efficiency of molding.

EXAMPLES

Now, the invention is described in more detail hereinbelow with reference to the following Examples and Comparative Examples, which are provided for the purposes of illustration only, however, and are not intended to restrict the scope of the invention.

The intrinsic viscosity, glass transition temperature, crystallization temperature, melting point, melt stability, deflection temperature under load, mechanical characteristics, impact strength, water absorption, steam resistance, chemical resistance, degree of crystallization after quench, blistering resistance and flame retardance were evaluated according to the procedures described below.

Intrinsic Viscosity [η]

A sample of the polyamide or the polyamide composition to be measured is dissolved in concentrated sulfuric acid to give sample solutions having a concentration of 0.05, 0.1, 0.2 or 0.4 g/dl, and the inherent viscosity (η inh [dl/g]) of each sample solution is measured at 30° C. as follows:

$$\eta inh = [ln(t_1/t_0)]/C$$

wherein $t_0$ means flow down time [seconds] of solvent, $t_1$ means flow down time [seconds] of sample solution and C means concentration of sample in sample solution.

Extrapolating the data of ηinh with the control having a concentration of 0 gives the intrinsic viscosity [η] of the sample.

Glass Transition Temperature

A test film having a length of 30 mm, a width of 5 mm and a thickness of 0.2 mm is prepared using pellets of a polyamide composition by press molding at 330° C. The test film is thoroughly crystallized by drying under reduced pressure at 120° C. Then the temperature of the crystallized film is elevated from −120° C. to flow beginning temperature at a rate of temperature rise of 3° C. per minute under nitrogen. The peak temperature of primary dispersion, that is so-called α-dispersion, of loss tangent [tan δ] is determined with a viscoelastic measuring rheometer ["RVE-400" made by Rheology Inc.] under a frequency of 11 Hz.

Crystallization Temperature and Melting Point

A pellet of a polyamide composition is thoroughly melted and cooled to room temperature rapidly under nitrogen. The temperature of 10 mg of pellet thus treated is elevated from 30° C. to 350° C., at a rate of temperature rise of 10° C. per minute under nitrogen. The peak temperature of the exothermic curve, appearing at near 100° C., during this temperature elevation is determined by a differential scanning calorimeter [TA-300; trade name, made by Mettler Co., Ltd.], which is recorded as crystallization temperature. In addition, the peak temperature of the endothermic curve, appearing at near 300° C., during this temperature elevation is determined by a differential scanning calorimeter, which is recorded as melting point.

Melt Stability

A flask having inner volume of 100 cc is charged with 10 g of pellets of a polyamide composition. Then, a copper foil is equipped, by hanging, on the empty space, above the pellets, of the flask. The flask is immersed in an oil bath at a temperature of 340° C. for 2 hours with a continuous passage of nitrogen having a flow rate of 50 cc per minute. The change of color of the copper foil by an evolution of a gas involved by the degradation of polyamide components of the polyamide composition is observed visually. Evaluation is as follows:

○ means that no change of color is observed.

x means a change of color is observed.

Deflection Temperature Under Load

Test piece having a length of 63.5 mm, a width of 13 mm and a thickness of 3 mm is prepared by injection molding at mold temperature of 100° C. and tested for their deflection temperature under the load of 1.85 Mpa according to ASTM D648, incorporated herein by reference.

Mechanical Characteristics

Tensile Strength, bending strength and bending modulus are measured as follows:

Tensile Strength

Test piece having a shape of JIS No. 1 dumbbell-type and a thickness of 3 mm is prepared by injection molding at mold temperature of 100° C. and tested for the tensile strength according to ASTM D638, incorporated herein by reference.

Bending Strength and Bending Modulus

Test piece having a length of 63.5 mm, a width of 13 mm and a thickness of 3 mm is prepared by injection molding at mold temperature of 100° C. and tested for the bending strength and bending modulus according to ASTM D790, incorporated herein by reference.

IZOD Impact Strength

Test piece having a length of 63.5 mm, a width of 13 mm and a thickness of 3 mm is prepared by injection molding at mold temperature of 100° C. and tested for the IZOD impact strength according to ASTM D256, incorporated herein by reference.

Water Absorption

Test piece having a shape of JIS No. 1 dumbbell-type and a thickness of 3 mm is prepared by injection molding at mold temperature of 100° C. and immersed in water at 23° C. for 24 hours. The weight growth is calculated. The ratio of water growth based on the weight of the test piece before the immersion in water is determined as water absorption.

Steam Resistance

Test piece having a shape of JIS No. 1 dumbbell-type and a thickness of 3 mm is prepared by injection molding at mold temperature of 100° C. and treated with steam in an autoclave under 2 atmospheric pressures, at 120° C. for 60 hours. The test piece thus treated with steam is tested for the tensile strength according to ASTM D638. The retention of tensile strength (%) against the values before the steam treatment is calculated.

Chemical Resistance

Test piece having a shape of JIS No. 1 dumbbell-type and a thickness of 3 mm is prepared by injection molding at mold temperature of 100° C. and immersed in methanol at 23° C. for 168 hours. The test piece thus treated with methanol is tested for the tensile strength according to ASTH D638. The retention of tensile strength (%) against the values before the methanol treatment is calculated.

Degree of Crystallization after Quench

A test film having a length of 50 mm, a width of 10 mm and a thickness of 0.2 mm is prepared using pellets of a polyamide composition by press molding at 100° C. The temperature of the test film is elevated from 30° C. to 350° C. at a rate of temperature rise of 10° C. per minute under nitrogen. The exothermic volume of crystallization is determined, by a differential scanning calorimeter [TA-300; trade name, made by Mettler Co., Ltd.], based on the crystallization peak of the exothermic curve, appearing at near glass transition temperature, during this temperature elevation. The smaller the exothermic volume of crystallization becomes, the higher the degree of crystallization of the test film becomes.

Blistering Resistance

Test pieces having a length of 30 mm, a width of 10 mm and a thickness of 0.5 mm are prepared by injection molding at mold temperatures of 120° C. or 140° C. and stood still for 72 hours under the atmosphere having the relative humidity (R.H.) of 50% and a temperature of 40° C. The resulting test pieces are subjected to a reflow step-of the thermal profile as shown in FIG. 1 by using an infrared oven ["SMT Scope", trade name; manufactured by Sanyo Seiko Co., Ltd.] . The heat profile of the test pieces is monitored by a sensor which is equipped on the test piece. The reflow step is conducted by changing the actual peak temperature, as described in FIG. 1, from 250° C. to 270° C. at intervals of 5° C. After completion of the reflow step, appearance of the test pieces is observed. The critical temperature at which the test piece is not melted and no blister appeared on its surface is designated as a blistering resistant temperature. The term "blistering" means the phenomenon wherein blisters appear on the surface of a molded product.

Flame Retardance

Flame retardance is measured according to the UL-94 Standards, which is incorporated by reference. A test piece of 1mm thick prepared by injection molding at the mold temperature of 140° C., is vertically fixed with its top end being clamped. Its bottom end is exposed to a predetermined flame for 10 seconds, and then separated from it. The time for which the test piece is still burning is read [first test]. After the test piece is spontaneously extinguished, its bottom end is again exposed to the flame, and then separated from it, and the time for which the test piece is still burning is read [second test]. Five test pieces of one sample are subjected to the flame test in that manner as described above. Five data of the burning time in the first test and five data thereof in the second test, that is, 10 data of one sample are thus obtained. The total of those 10 data are represented by T; and the maximum value thereof is represented by M. Samples of which T is up to 50 seconds and M is up to 10 seconds, which did not burn to the clamped top end, and of which the burning melt of the test piece having dropped onto a cotton cloth, which is disposed at a position of 12 inches below the test piece, did not ignite the cotton cloth rank as the class "V-0"; samples of which T is up to 250 seconds and M is up to 30 seconds and which are the same as those of "V-0" for the other matters rank as the class "V-1"; and samples of which T is up to 250 seconds and M is up to 30 seconds, which did not burn to the clamped top end, but of which the burning melt of the test piece having dropped onto a cotton cloth, which is disposed at a position of 12 inches below the test piece, ignited the cotton cloth rank as the class "V-2".

Following components were used in the following Examples and Comparative Examples.

Semiaromatic Polyamides

A polyamide having intrinsic viscosity [η] of 1.00 dl/g, melting point of 308° C. and percentage of terminal-blocking by benzoic acid of 90%, made of dicarboxylic acid units of terephthalic acid and diamine units of 85 mole % of 1,9-nonanediamine and 15 mole % of 2-methyl-1,8-octanediamine, prepared according to the method described in the Example 6 of the U.S. Pat. No. 5,607,608, incorporated herein by reference.

PA9-9T

A polyamide having intrinsic viscosity [η] of 1.00 dl/g, melting point of 284° C. and percentage of terminal-blocking by benzoic acid of 90%, made of dicarboxylic acid units of 79 mole % of terephthalic acid and 21mole % of azelaic acid and diamine units of 85 mole % of 1,9-nonanediamine and 15 mole % of 2-methyl-1,8-octanediamine, prepared by the method described in the Example 1 of Japanese Patent Application Laid-open No. 2000-86759 (JPA 2000-86759), incorporated herein by reference.

PA6-6T

A polyamide having intrinsic viscosity [η] of 1.10 dl/g, melting point of 310° C., and percentage of terminal-blocking by benzoic acid of 89%, made of dicarboxylic acid units of 55 mole % of terephthalic acid and 45 mole % of adipic acid and diamine units of 1,6-hexanediamine, prepared by the method described in the Example 1 of Japanese Patent Application Laid-open No. 2000-86759 (JPA 2000-86759), incorporated herein by reference.

Aliphatic Polyamides

PA9-9

A polyamide having intrinsic viscosity [η] of 1.00 dl/g, melting point of 190° C. and percentage of terminal-blocking by benzoic acid of 90%, made of dicarboxylic acid units of azelaic acid and diamine units of 85 mole % of 1,9-nonanediamine and 15 mole % of 2-methyl-1,8-octanediamine, prepared by the method described in the Example 1 of Japanese Patent Application Laid-open No. Hei 9-316191(JPA 9-316191), incorporated herein by reference.

PA6-12

A polyamide having intrinsic viscosity [η] of 0.95 dl/g, melting point of 220° C. and percentage of terminal-blocking by benzoic acid of 90%, made of dicarboxylic acid units of dodecanedicarboxylic acid and diamine units of 1,6-hexanediamine, prepared by the method described in the Example 1 of Japanese Patent Application Laid-open No. Hei 9-316191(JPA 9-316191), incorporated herein by reference.

PA6

Polyamide made of ε-caprolactam having intrinsic viscosity [η] of 1.2 dl/g and melting point of 220° C. ["UBE nylon 1013BK"; trade name, made by Ube Industries, Inc.]

PA66

Polyamide made of adipic acid and 1,6-hexanediamine having intrinsic viscosity [η] of 1.1 dl/g and melting point of 265° C. ["Reona B 1300"; trade name, made by Asahi Chemical Industry Co., Ltd.]

Metal Hydroxide

Magnesium hydroxide, made by Wako Pure Chemical Industries, Ltd.

Flame Retardant

Brominated polystyrene modified with glycidyl methacrylate ["CN2 044C"; trade name, made by Great Lakes Chemical Corp.], which is abbreviated as "GMA-PBrS".

Flame-Retardant Synergist

Zinc stannate ["FLAMTARD-S"; trade name, made by DK Fine Co., Ltd.]

Nucleating Agent

Talc ["PKP-80"; trade name; treated by aminosilane, Fuji Talc Industries Co., Ltd.]

Fillers

Glass fiber ["CS-3J-256S"; trade name, made by Nitto Boseki Co., Ltd.], which is abbreviated as "GF".

Powder of polytetrafluoroethylene ["Tefron 6-J"; trade name, made by Du Pont Inc. ], which is abbreviated as "PTFE". This filler also act as an anti-dripping agent.

Examples 1 to 5

The components shown in Table 1 were blended in dry with a ratio shown in Table 1. The resulting blend was subjected to a twin-screw extruder ("TEX44C"; trade name, made by Nippon Seiko Inc.] and extruded in melt under the condition of the cylinder temperature of 320° C. The melt strands were cooled and cut in pieces to give pellets of a polyamide composition. The pellets were dried in vacuum at 120° C. for 12 hours and tested for their crystallization temperature, melting point and melt stability. Results are shown in Table 1. Also, the dried pellets were subjected to injection molding under the condition of the cylinder temperature of 320° C. and mold temperature of 100° C. to give a test piece having a determined shape. The water absorption, mechanical characteristics, steam resistance, chemical resistance, IZOD impact strength and deflection temperature under load were measured using the test piece according to the above described procedures. Results are shown in Table 1. In addition, glass transition temperature and degree of crystallization after quench were determined using the dried pellets according to the above described procedures. Results are shown in Table 1.

TABLE 1

|  | Ex. 1 | Ex. 2 | Ex. 3 | Ex. 4 | Ex. 5 |
| --- | --- | --- | --- | --- | --- |
| Semiaromatic Polyamide [part by weight] | 90 | 80 | 80 | 80 | 60 |
| PA9-T |  |  |  |  |  |
| Aliphatic Polyamide [part by weight] |  |  |  |  |  |
| PA9-9 | 10 | 20 |  | 20 | 40 |
| PA6-12 |  |  | 20 |  |  |
| Magnesium hydroxide [part by weight] |  |  |  | 1 |  |

TABLE 1-continued

|  | Ex. 1 | Ex. 2 | Ex. 3 | Ex. 4 | Ex. 5 |
| --- | --- | --- | --- | --- | --- |
| Talc [part by weight] |  |  |  | 0.2 |  |
| Filler [part by weight] GF | 50 | 50 | 50 | 50 | 50 |
| Glass Transition Temperature [° C.] | 105 | 97 | 98 | 97 | 87 |
| Crystallization Temperature [° C.] | 124 | 116 | 115 | 113 | 102 |
| Melting Point [° C.] | 306 | 304 | 303 | 305 | 300 |
| Melt Stability | ◯ | ◯ | ◯ | ◯ | ◯ |
| Water Absorption [wt %] | 0.10 | 0.08 | 0.08 | 0.07 | 0.05 |
| Tensile Strength [Mpa] | 174 | 178 | 177 | 176 | 173 |
| Bending Strength [Mpa] | 221 | 222 | 222 | 221 | 224 |
| Bending Modulus [Gpa] | 11.4 | 11.6 | 11.5 | 11.5 | 11.5 |
| Steam Resistance [%] | 85 | 82 | 83 | 83 | 81 |
| Chemical Resistance [%] | 88 | 85 | 86 | 87 | 84 |
| IZOD Impact Strength (23° C., notched) [KJ/m$^2$] | 10.4 | 10.6 | 10.5 | 10.5 | 10.9 |
| Deflection Temperature under load [° C.] | 282 | 275 | 276 | 278 | 270 |
| Degree of Crystallization after quench [J/g] | 2 | 0 | 0 | 0 | 0 |

Comparative Examples 1 to 6

The components shown in Table 2 were blended in dry with a ratio shown in Table 2. The resulting blend was subjected to a twin-screw extruder ["TEX44C."; trade name, made by Nippon Seiko Inc.] and extruded in melt under the condition of the cylinder temperature of 320° C. The melt strands were cooled and cut in pieces to give pellets of a polyamide composition. The pellets were dried in vacuum at 120° C. for 12 hours and tested for their crystallization temperature, melting point and melt stability. Results are shown in Table 2. Also, the dried pellets were subjected to injection molding under the condition of the cylinder temperature of 320° C. and mold temperature of 100° C. to give a test piece having a determined shape. The water absorption, mechanical characteristics, steam resistance, chemical resistance, HOD impact strength and deflection temperature under load were measured using the test piece according to the above described procedures. Results are shown in Table 2. In addition, glass transition temperature and degree of crystallization after quench were determined using the dried pellets according to the above described procedures. Results are shown in Table 2.

TABLE 2

|  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| Semiaromatic Polyamide [part by weight] |  |  |  |  |  |  |
| PA9-T | 100 |  |  | 45 | 80 | 80 |
| PA9-9T |  | 100 |  |  |  |  |
| PA6-6T |  |  | 100 |  |  |  |
| Aliphatic Polyamide [part by weight] |  |  |  |  |  |  |
| PA9-9 |  |  |  | 55 |  |  |
| PA6 |  |  |  |  | 20 |  |
| PA66 |  |  |  |  |  | 20 |
| Magnesium hydroxide [part by weight] |  |  |  |  |  |  |
| Talc [part by weight] |  |  |  |  |  |  |

TABLE 2-continued

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Filler [part by weight] GF | 50 | 50 | 50 | 50 | 50 | 50 |
| Glass Transition Temperature [° C.] | 120 | 98 | 93 | 85 | 103 | 102 |
| Crystallization Temperature [° C.] | 138 | 119 | 115 | 103 | 122 | 122 |
| Melting Point [° C.] | 308 | 284 | 310 | 280 | 300 | 300 |
| Melt Stability | ○ | ○ | X | X | X | X |
| Water Absorption [wt %] | 0.15 | 0.10 | 0.57 | 0.10 | 0.23 | 0.27 |
| Tensile Strength [Mpa] | 174 | 168 | 170 | 161 | 172 | 172 |
| Bending Strength [Mpa] | 210 | 209 | 215 | 199 | 208 | 208 |
| Steam Resistance [%] | 87 | 78 | 55 | 64 | 79 | 78 |
| Chemical Resistance [%] | 89 | 82 | 61 | 65 | 81 | 80 |
| IZOD Impact Strength (25° C., notched) [KJ/m$^2$] | 10.5 | 10.7 | 9.2 | 11.0 | 10.5 | 10.6 |
| Deflection Temperature under load [° C.] | 285 | 263 | 267 | 242 | 273 | 274 |
| Degree of Crystallization after quench [J/g] | 31 | 0 | 0 | 0 | 4 | 4 |

Examples 6, 7 and Comparative Examples 7, 8

The components shown in Table 3 were blended in dry with a ratio shown in Table 3. The resulting blend was subjected to a twin-screw extruder (TEX44C; trade name, made by Nippon Seiko Inc.] and extruded in melt under the condition of the cylinder temperature of 320° C. The melt strands were cooled and cut in pieces to give pellets of a polyamide composition. The pellets were dried in vacuum at 120° C. for 12 hours and tested for their crystallization temperature, melting point and melt stability. Results are shown in Table 2. The dried pellets were subjected to injection molding under the condition of the cylinder temperature of 320° C. and mold temperature of 100° C., to give a test piece having a determined shape. The water absorption, mechanical characteristics, steam resistance, chemical resistance, IZOD impact strength and deflection temperature under load were measured using the test piece according to the above described procedures. Results are shown in Table 3. In addition, glass transition temperature and degree of crystallization after quench were determined using the dried pellets according to the above described procedures. Results are shown in Table 3. Finally, the blistering resistance and the flame retardance were measured according to the above described procedures. Results are shown in Table 3.

TABLE 3

|  | Ex. 6 | Ex. 7 | Comp. Ex. 7 | Comp. Ex. 8 |
|---|---|---|---|---|
| Semiaromatic Polyamide [part by weight] | | | | |
| PA9-T | 80 | 80 | 100 | |
| PA6-6T | | | | 100 |
| Aliphatic Polyamide [part by weight] | | | | |
| PA9-9 | 20 | | | |
| PA6-12 | | 20 | | |
| Flame Retardant (GMA-PBrS) [part by weight] | 60 | 60 | 60 | 60 |
| Zinc Stannate [part by weight] | 13 | 13 | 13 | 13 |
| Filler [part by weight] | | | | |
| GF | 86 | 86 | 86 | 86 |
| PTFE | 2 | 2 | 2 | 2 |
| Glass Transition Temperature [°C] | 97 | 98 | 120 | 93 |
| Crystallization Temperature [°C] | 116 | 115 | 138 | 115 |
| Melting Point [°C] | 304 | 305 | 308 | 310 |

TABLE 3-continued

|  | Ex. 6 | Ex. 7 | Comp. Ex. 7 | Comp. Ex. 8 |
|---|---|---|---|---|
| Melt Stability | ○ | ○ | ○ | X |
| Water Absorption [wt %] | 0.05 | 0.05 | 0.04 | 0.13 |
| Tensile Strength [Mpa] | 177 | 176 | 178 | 175 |
| Bending Strength [Mpa] | 203 | 204 | 206 | 200 |
| Bending Modulus [Gpa] | 11.1 | 10.9 | 11.3 | 10.6 |
| Steam Resistance [%] | 87 | 88 | 91 | 84 |
| Chemical Resistance [%] | 88 | 87 | 88 | 83 |
| IZOD Impact Strength [Kj/m$^2$] (23°C., notched) | 10.6 | 10.5 | 10.4 | 10.1 |
| Deflection Temperature under load [°C.] | 279 | 280 | 284 | 267 |
| Degree of Crystallization [J/g] after quench | 0 | 0 | 28 | 0 |
| Blistering Resistance Temperature [°C.] | | | | |
| Mold Temperature of 140° C. | 275 | 275 | 275 | 275 |
| Mold Temperature of 120° C. | 275 | 275 | 275 | 275 |
| Flame Retardance | V-0 | V-0 | V-0 | V-0 |

Having now fully described the invention, it will be apparent to one of the ordinary skill in the art that many changes and modifications can be made thereto without departing from the spirit or scope of the invention as set forth herein.

This application is based on Japanese Patent Application No. 2001-150275, filed on May 21, 2001, the entire contents of which are hereby incorporated by reference.

What is claimed is:

1. A polyamide composition, comprising:

50 to 90 parts by weight of (A) one or more semiaromatic polyamides having dicarboxylic acid units containing 60 to 100 mole % of terephthalic acid units and diamine units containing a total of 60 to 100 mole % of 1,9-nonanediamine units and/or 2-methyl-1,8-octanediamine units; and wherein the amount by weight of (A) is based on 100 parts by weight of both (A) and (B); and 50 to 10 parts by weight of (B) one or more aliphatic polyamides selected from the group consisting of a polyamide L and polyamide MN; wherein the polyamide L repeating unit is represented by

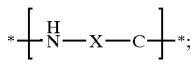

wherein X is an alkylene unit; and
the polyamide MN repeating unit is represented by

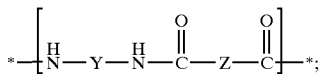

wherein Y and Z are alkylene units and are the same or different; in which the total number of carbon atoms of the polyamide L repeating unit and one half of the total number of carbon atoms of the polyamide MN repeating unit is 7 to 12; and wherein the amount by weight of (B) is based on 100 parts by weight of both (A) and (b).

2. The polyamide composition of claim 1, wherein the aliphatic polyamides (B) have a total number of carbon atoms of the polyamide L repeating unit and one half of the total number of carbon atoms of the polyamide MN repeating unit is 9.

3. The polyamide composition of claim 2, wherein the aliphatic polyamides (B) comprise a polyaxnide MN; wherein said polyamide MN has, has the diamine units, 1,9-nonanediamine units and/or 2-methyl-1,8-octanediamine units.

4. The polyamide composition of claim 3, further comprising 0.1 to 20 parts by weight of a metal hydroxide and/or a metal oxide relative to 100 parts by weight, in total, of the semiaromatic polyamides (A) and aliphatic polyamides (B).

5. The polyamide composition of claim 3, further comprising 1 to 100 parts by weight of a flame retardant having one or more bromine atoms and/or 0.1 to 50 parts by weight of a flame-retardant synergist, each relative to 100 parts by weight, in total, of the semiaromatic polyamides (A) and aliphatic polyamides (B).

6. The polyamide composition of claim 2, further comprising 0.1 to 20 parts by weight of a metal hydroxide, which is selected from the group consisting of magnesium hydroxide, aluminum hydroxide, calcium hydroxide, barium hydroxide, and mixtures thereof; and/or a metal oxide, which is selected from the group consisting of magnesium oxide, aluminum oxide, calcium oxide, barium oxide, and mixtures thereof, relative to 100 parts by weight, in total, of the semiaromatic polyamides (A) and aliphatic polyamides (B).

7. The polyamide composition of claim 6, further comprising 1 to 100 parts by weight of a flame retardant having one or more bromine atoms and/or 0.1 to 50 parts by weight of a flame-retardant synergist, which is selected from the group consisting of sodium antimonate, zinc stannate, zinc borate, and mixtures thereof; each relative to 100 parts by weight, in total, of the semiaromatic polyamides (A) and aliphatic polyamides (B).

8. The polyamide composition of claim 2, further comprising 1 to 100 parts by weight of a flame retardant having one or more bromine atoms and/or 0.1 to 50 parts by weight of a flame-retardant synergist, each relative to 100 parts by weight, in total, of the semiaromatic polyamides (A) and aliphatic polyamides (B).

9. The polyamide composition of claim 2, further comprising 0.1 to 20 parts by weight of a single metal hydroxide and/or a single metal oxide relative to 100 parts by weight, in total, of the semiaromatic polyamides (A) and aliphatic polyamides (B).

10. The polyamide composition of claim 9, further comprising 1 to 100 parts by weight of a flame retardant having one or more bromine atoms and/or 0.1 to 50 parts by weight of a flame-retardant synergist, which is selected from the group consisting of a mixed metal oxide, a mixed metal hydroxide, a metal-metalloid oxide, a kaolinite, a clay, a calcium carbonate, and mixtures thereof, each relative to 100 parts by weight, in total, of the semiaromatic polyamides (A) and aliphatic polyamides (B).

11. The polyamide composition of claim 1, wherein the aliphatic polyamides (B) comprise a polyamide MN; wherein said polyamide MN has, as the diamine units, 1,9-nonanediamine units and/or 2-methyl-1,8-octanediamine units.

12. The polyamide composition of claim 11, further comprising 0.1 to 20 parts by weight of a metal hydroxide, which is selected from the group consisting of magnesium hydroxide, aluminum hydroxide, calcium hydroxide, barium hydroxide, and mixtures thereof; and/or a metal oxide, which is selected from the group consisting of magnesium oxide, aluminum oxide, calcium oxide, barium oxide, and mixtures thereof; relative to 100 parts by weight, in total, of the semiaromatic polyamides (A) and aliphatic polyamides (B).

13. The polyamide composition of claim 12, further comprising 1 to 100 parts by weight of a flame retardant having one or more bromine atoms and/or 0.1 to 50 parts by weight of a flame-retardant synergist, which is selected from the group consisting of sodium antimonate, zinc stannate, zinc borate, and mixtures thereof; each relative to 100 parts by weight, in total, of the semiaromatic polyamides (A) and aliphatic polyamides (B).

14. The polyamide composition of claim 11, further comprising 1 to 100 parts by weight of a flame retardant having one or more bromine atoms and/or 0.1 to 50 parts by weight of a flame-retardant synergist, each relative to 100 parts by weight, in total, of the semiaromatic polyamides (A) and aliphatic polyamides (B).

15. The polyamide composition of claim 11, further comprising 0.1 to 20 parts by weight of a single metal hydroxide and/or a single metal oxide relative to 100 parts by weight, in total, of the semiaromatic polyamides (A) and aliphatic polyamides (B).

16. The polyamide composition of claim 15, further comprising 1 to 100 parts by weight of a flame retardant having one or more bromine atoms and/or 0.1 to 50 parts by weight of a flame-retardant synergist, which is selected from the group consisting of a mixed metal oxide, a mixed metal hydroxide, a metal-metalloid oxide, a kaolinite, a clay, a calcium carbonate, and mixtures thereof, each relative to 100 parts by weight, in total, of the semiaromatic polyamides (A) and aliphatic polyamides (B).

17. The polyamide composition of claim 1, further comprising 0.1 to 20 parts by weight of a metal hydroxide, which is selected from the group consisting of magnesium hydroxide, aluminum hydroxide, calcium hydroxide, barium hydroxide, and mixtures thereof; and/or a metal oxide, which is selected from the group consisting of magnesium oxide, aluminum oxide, calcium oxide, barium oxide, and mixtures thereof; relative to 100 parts by weight, in total, of the semiaromatic polyamides (A) and aliphatic polyamides (B).

18. The polyamide composition of claim 17, further comprising 1 to 100 parts by weight of a flame retardant having one or more bromine atoms and/or 0.1 to 50 parts by weight of a flame-retardant synergist, which is selected from the group consisting of sodium antimonate, zinc stannate, zinc borate, and mixtures thereof; each relative to 100 parts by weight, in total, of the semiaromatic polyamides (A) and aliphatic polyamides (B).

19. The polyamide composition of claim 1, further comprising 1 to 100 parts by weight of a flame retardant having one or more bromine atoms and/or 0.1 to 50 parts by weight of a flame-retardant synergist, each relative to 100 parts by weight, in total, of the semiaromatic polyamides (A) and aliphatic polyamides (B).

20. The polyamide composition of claim 1, further comprising 0.01 to 10 parts by weight of a nucleating agent relative to 100 parts by weight, in total, of the semiaromatic polyamides (A) and aliphatic polyamides (B).

21. The polyamide composition of claim 1, further comprising 0.1 to 200 parts by weight of a filler relative to 100 parts by weight, in total, of the semiaromatic polyamides (A) and aliphatic polyamides (B).

22. A molded article comprising a polyamide composition of claim 1.

23. A method of making the molded article of claim 22, comprising molding the polyamide composition into the article.

24. A method of making the polyamide composition of claim 1, comprising combining (A) and (B).

25. The polyamide composition of claim 1, further comprising 0.1 to 20 parts by weight of a single metal hydroxide and/or a single metal oxide relative to 100 parts by weight, in total, of the semiaromatic polyamides (A) and aliphatic polyamides (B).

26. The polyamide composition of claim 25, further comprising 1 to 100 parts by weight of a flame retardant having one or more bromine atoms and/or 0.1 to 50 parts by weight of a flame-retardant synergist, which is selected from the group consisting of a mixed metal oxide, a mixed metal hydroxide, a metal-metalloid oxide, a kaolinite, a clay, a calcium carbonate, and mixtures thereof, each relative to 100 parts by weight, in total, of the semiaromatic polyamides (A) and aliphatic polyamides (B).

27. The polyamide composition of claim 1, wherein the

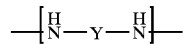

component of the polyamide MN is obtained from at least one aliphatic diamine selected from the group consisting of 1,6-hexanediamine, 1,8-octanediamine, 1,9-nonanediamine, 1,10-decanediamine, 1,11-undecanediamine, 1,12-dodecanediamine, 2-methyl-1,8-octanediamine, 2-methyl-1,5-pentanediamine, 3-methyl-1,5-pentanediamine, 2,2,4-trimethyl-1,6-hexanediamine, 2,4,4-trimethyl-1,6-hexanediamine, and 5-methyl-1,9-nonanediamine.

28. The polyamide composition of claim 1, wherein the

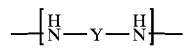

component of the polyamide MN is obtained from at least one aliphatic diamine selected from the group consisting of 1,9-nonanediamine and 2-methyl-1,8-octanediamine.

* * * * *